(12) United States Patent
Vaillant et al.

(10) Patent No.: US 12,100,174 B2
(45) Date of Patent: Sep. 24, 2024

(54) METHODS AND SYSTEM FOR DYNAMICALLY ANNOTATING MEDICAL IMAGES

(71) Applicant: GE Precision Healthcare LLC, Milwaukee, WI (US)

(72) Inventors: Régis Vaillant, Villebon sur Yvettte (FR); Maxime Taron, Boulogne Billancourt (FR); Bastien Guéry, Paris (FR)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 474 days.

(21) Appl. No.: 17/385,707

(22) Filed: Jul. 26, 2021

(65) Prior Publication Data

US 2023/0021332 A1 Jan. 26, 2023

(51) Int. Cl.
*G06T 7/70* (2017.01)
*G06T 7/00* (2017.01)

(52) U.S. Cl.
CPC .................. *G06T 7/70* (2017.01); *G06T 7/97* (2017.01); *G06T 2207/10116* (2013.01)

(58) Field of Classification Search
CPC .... G06T 7/00; G06T 7/55; G06T 7/70; G06T 7/85; G06T 7/97; G06T 11/00; G06T 2207/10116; G06T 2207/10121; G06T 11/006
See application file for complete search history.

(56) References Cited

U.S. PATENT DOCUMENTS

| | | | |
|---|---|---|---|
| 5,257,183 A * | 10/1993 | Tam ...................... | G06T 11/005 378/4 |
| 7,583,780 B2 * | 9/2009 | Hsieh .................... | A61B 6/583 378/4 |
| 8,104,958 B2 * | 1/2012 | Weiser .................. | A61B 6/583 378/207 |
| 8,391,580 B2 * | 3/2013 | Bornfleth ................. | G06T 7/33 382/128 |
| 9,378,550 B2 * | 6/2016 | Twellmann .............. | G06T 7/33 |
| 9,408,579 B2 * | 8/2016 | Yamakawa ........... | G06T 11/006 |
| 9,684,972 B2 * | 6/2017 | Weese ..................... | G06T 7/73 |

(Continued)

OTHER PUBLICATIONS

Movassaghi et al. "A quantitative analysis of 3-D coronary modeling from two or more projection images," in IEEE Transactions on Medical Imaging, vol. 23, No. 12, pp. 1517-1531, Dec. 2004, doi: 10.1109/TMI.2004.837340. (Year: 2004).*

*Primary Examiner* — Edward F Urban
*Assistant Examiner* — Benedict E Lee
(74) *Attorney, Agent, or Firm* — McCoy Russell LLP

(57) ABSTRACT

Various methods and systems are provided for a medical imaging system. In one embodiment, a method for a projection imaging system includes acquiring a first image of a region of interest (ROI) with the projection imaging system in a first position, determining a three-dimensional (3D) location of an annotation on the first image via a geometric transformation using planes, acquiring a second image of the ROI with the projection imaging system in a second position, determining a location of the annotation on the second image based on the 3D location of the annotation in the first position and a geometry of the second position, and displaying the annotation on the second image in response to an accuracy check being satisfied.

17 Claims, 4 Drawing Sheets

(56) References Cited

U.S. PATENT DOCUMENTS

| | | | |
|---|---|---|---|
| 9,830,718 B2* | 11/2017 | Hirai | G06T 15/08 |
| 10,383,591 B2* | 8/2019 | Fieselmann | A61B 6/505 |
| 2014/0016743 A1* | 1/2014 | Egli | G01B 15/00 |
| | | | 378/41 |
| 2018/0192985 A1* | 7/2018 | Maass | A61B 6/032 |
| 2018/0264288 A1* | 9/2018 | Sakata | A61B 6/4014 |
| 2022/0020215 A1* | 1/2022 | Banerjee | G06T 7/55 |
| 2023/0020252 A1* | 1/2023 | Kruecker | A61B 6/469 |

* cited by examiner

METHODS AND SYSTEM FOR DYNAMICALLY ANNOTATING MEDICAL IMAGES

FIELD

Embodiments of the subject matter disclosed herein relate to medical imaging, and more particularly, to x-ray fluoroscopic imaging.

BACKGROUND

Non-invasive imaging technologies allow images of the internal structures or features of a patient or object to be obtained without performing an invasive procedure on the patient or object. In particular, such non-invasive imaging technologies rely on various physical principles, such as the differential transmission of x-rays through the target volume or the reflection of acoustic waves, to acquire data and to construct images or otherwise represent the observed internal features of the patient or object.

For example, in fluoroscopy and other x-ray based imaging technologies such as computed tomography (CT), x-ray radiation is directed toward a subject, typically a patient in a medical diagnostic application, a package or baggage in a security screening application, or a fabricated component in an industrial quality control or inspection application. A portion of the radiation impacts a detector where the image data is collected and used in an image generation process. In the images produced by such systems, it may be possible to identify and examine the internal structures and organs within a patient's body, objects within a package or container, or defects (e.g., cracks) within a fabricated component.

In certain contexts, such as fluoroscopy applications used in support of interventional or navigation procedures, x-rays may be acquired at a high frame rate over an extended period to provide real-time image data that may be used to guide or navigate a tool within a patient. For example, cone beam computed tomography (CBCT) may be used in interventional x-ray guided needle procedures, preoperative three-dimensional (3D) imaging, and or intraoperative 3D imaging. In some procedures, a contrast injection may be used to visualize vasculature.

BRIEF DESCRIPTION

In one aspect, a method for a projection imaging system includes acquiring a first image of a region of interest (ROI) with the projection imaging system in a first position, determining a three-dimensional (3D) location of an annotation on the first image via a geometric transformation using planes, acquiring a second image of the ROI with the projection imaging system in a second position, determining a location of the annotation on the second image based on the 3D location of the annotation in the first position and a geometry of the second position, and displaying the annotation on the second image in response to an accuracy check being satisfied. In this way, an anatomical feature of interest may be dynamically and accurately tracked between images having different views.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
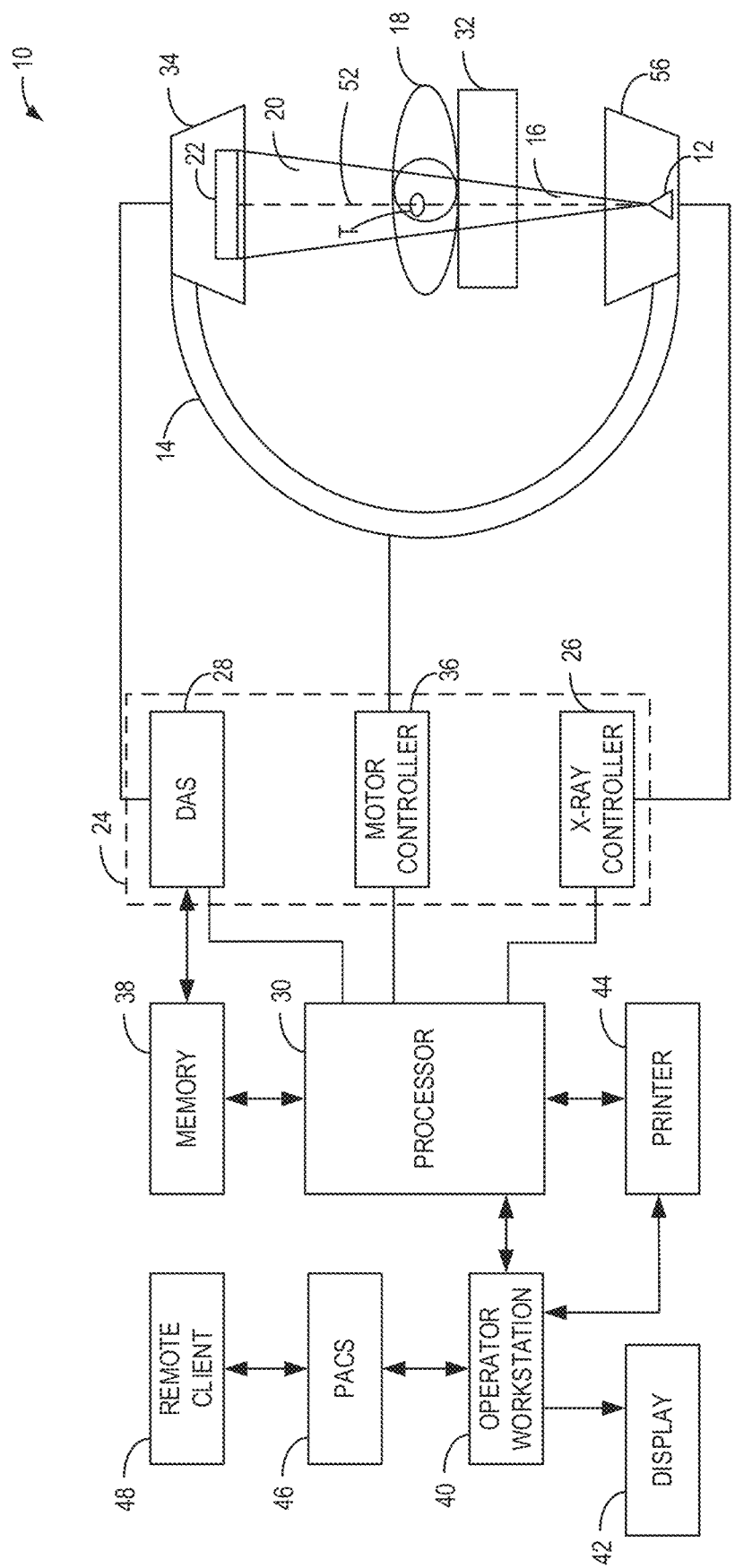
FIG. 1 shows a pictorial view of an imaging system, according to an embodiment.

Embodiments of the present disclosure will now be described, by way of example, with reference to the FIGS. 1-4, which relate to various embodiments for displaying annotations on medical images. During an interventional imaging procedure, such as a surgical procedure monitored/assisted by fluoroscopic imaging, continuous, real-time x-ray images of a patient may be displayed, allowing clinicians to monitor movement of anatomical features. An imaging chain may comprise an x-ray tube and an x-ray detector coupled to a C-arm. During the interventional imaging procedure, the imaging chain is positioned around the patient at different angles chosen by the clinicians, such as by rotating the C-arm, while the x-ray images are acquired. The patient may be supported by a table having a position that may also change during the procedure, such as by the table being translated with respect to the C-arm. The acquired x-ray images are two-dimensional (2D) conic projections. These different changes of the imaging chain enable the operator to see the anatomy under different angles and magnification factors. An anatomical feature of interest may be viewable in one or more of these different images. As the x-ray imaging chain orientation and/or the positioning of the table changes, the location of the anatomical feature of interest in the image also changes.

In some examples, the clinician tags or annotates an anatomical structure in the image to more easily review or locate the feature later. As used herein, the term "annotation" may refer to a precise location defined by a point (or points) in the image, a linear (e.g., line) segment having a precise location within the image, and/or a set of continuous line segments having a precise location within the image. As one example, the set of line segments may form a shape drawn by the clinician. Further, a length can be associated with the line segment(s) by summing a length of each individual segment. Each annotation may or may not include an associated text (e.g., a label). Annotation may be useful, for example, when a contrast injection happens for viewing vasculature. For example, contrast-injected vessels may be visible in the x-ray images near the time of injection, but once the contrast has washed out, the vessels are no longer viewable in the x-ray images. As an illustrative example, the clinician may annotate the left coronary artery by drawing a shape or line on the left coronary artery, which is visible in the image via the contrast injection, and label it as "left coronary." However, because the imaging chain orientation and/or the position of the table changes throughout the imaging procedure, the location of the anatomical feature of interest no longer aligns with a position of a static annotation.

Therefore, according to embodiments, a virtual three-dimensional (3D) space may be used to define the position of the annotation in 3D space instead of on the annotated image. The virtual 3D space exploits knowledge of the position and orientation of the different components of the x-ray imaging chain and the table at the time of the annotation. The defined position is coherent with an actual 3D location of the anatomy of interest. Then, the 2D position of the annotation on the image is updated as the position and orientation of the imaging chain and table change as additional images are acquired. Further, the display of the annotation on the subsequent images is controlled for accuracy due to potential discrepancies that may arise from determining 3D positions from 2D conic projections.

In this way, an anatomical feature of interest may be dynamically and accurately tracked across images obtained from a plurality of different view angles, which may enable the clinicians to more quickly and accurately locate the annotated (e.g., tagged) feature during and after the imaging procedure. As another example, the clinicians may spend less time and effort attempting to mentally track the location of the anatomical feature of interest throughout the imaging procedure. Further, because the virtual 3D space uses geometrical transformations instead of rendering a complex 3D model, an amount of computational power used to dynamically update the annotation during the imaging procedure is decreased.

Figure 2:
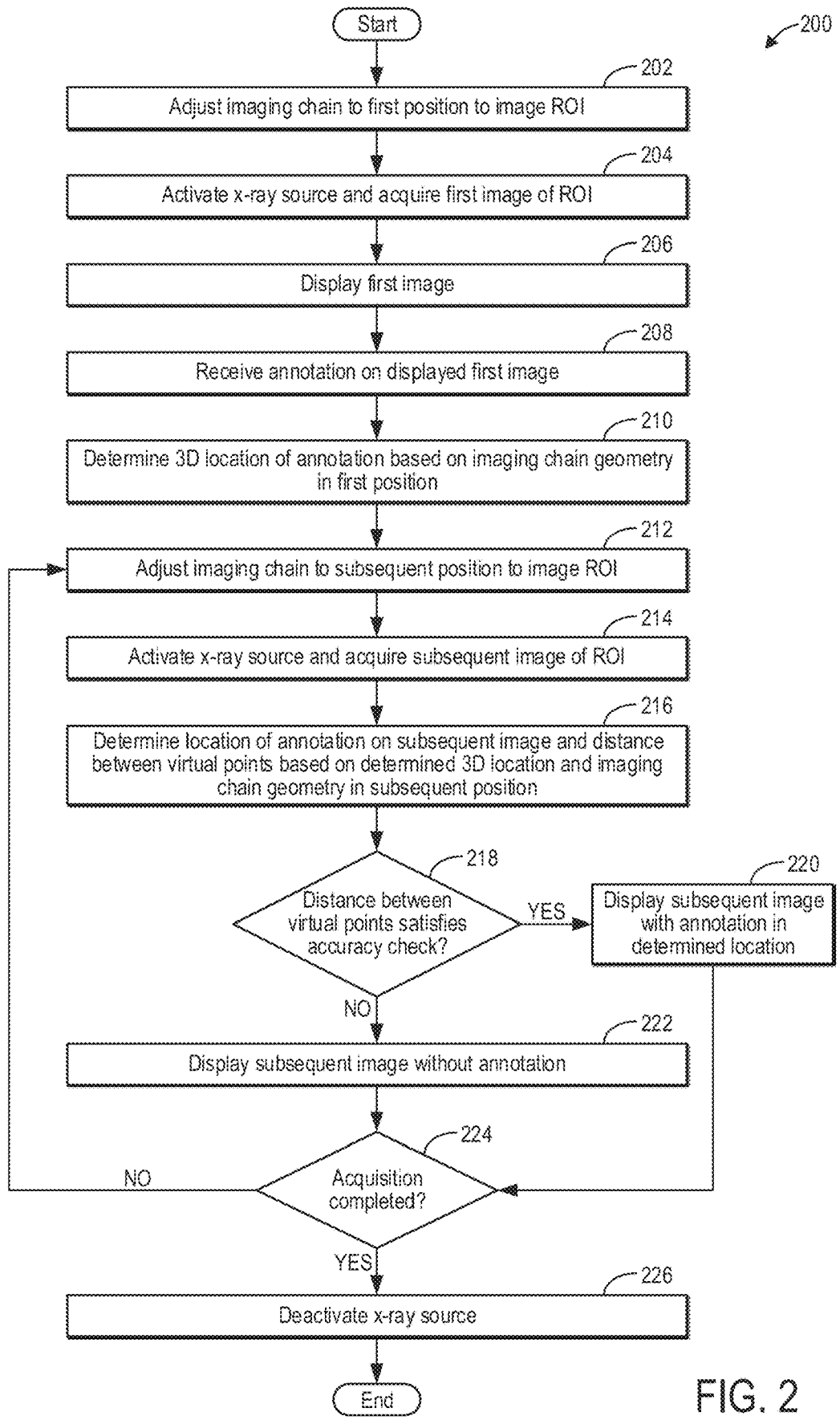
FIG. 2 is a flow chart illustrating a method for dynamic annotation during an interventional imaging procedure, according to an embodiment.
Figure 3:
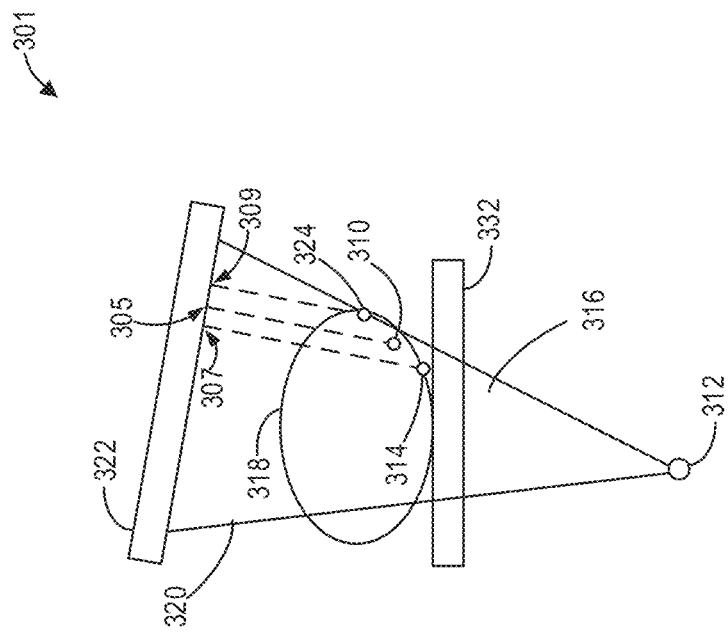
FIG. 3 shows a schematic diagram illustrating geometrically determining a three-dimensional location of an annotated point, according to an embodiment.
Figure 3:
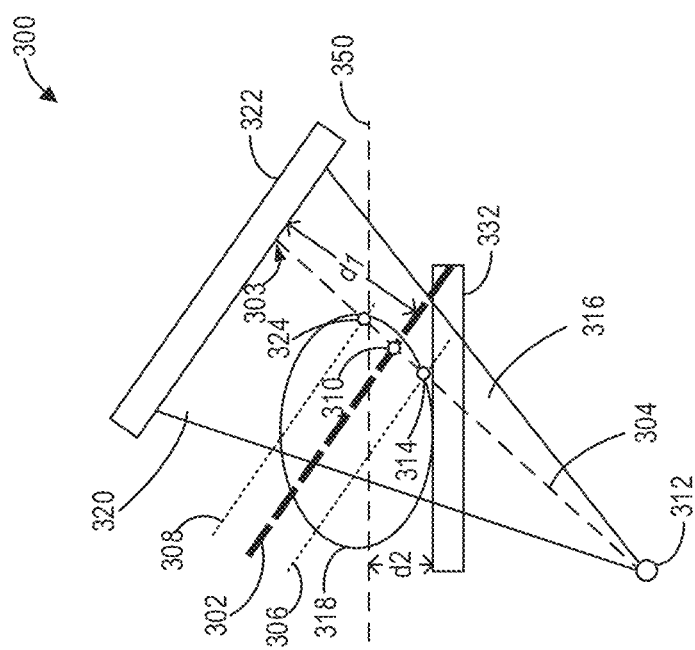
Figure 4:
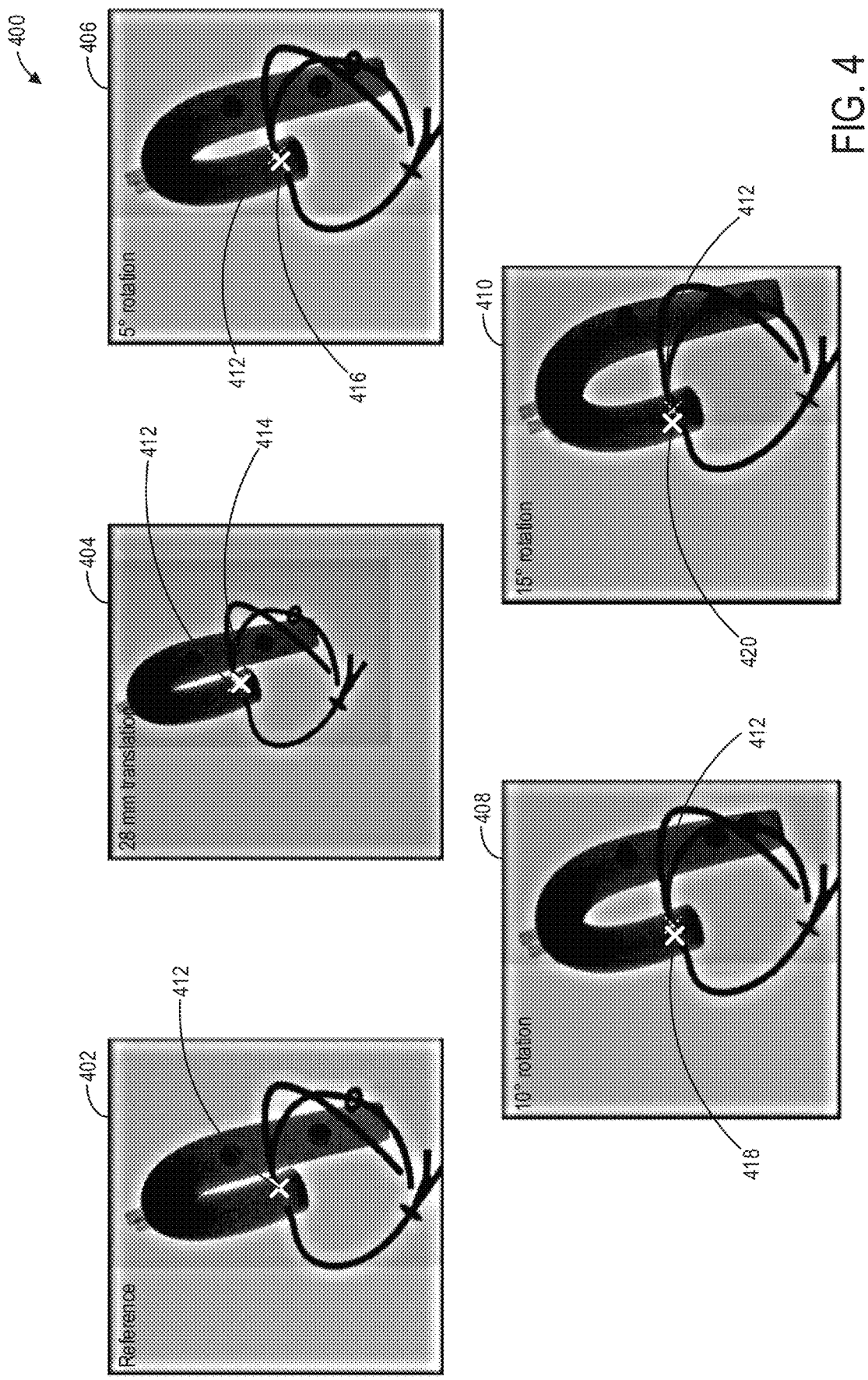
FIG. 4 shows an example of dynamically tracking an annotated point over a plurality of view angles, according to an embodiment.

An example of a projection imaging system that may be used to acquire medical images of a region of interest is shown in FIG. 1. FIG. 2 shows a flow chart of an example method that may be used to geometrically determine a location of an annotation in a virtual 3D space that does not use a fully rendered 3D model of the region of interest. Further, the annotation may be projected onto subsequently acquired images, such as images having different view angles, using the method of FIG. 2. FIG. 3 diagrammatically demonstrates determining the location of the annotation in 3D space. Further, an exemplary image sequence illustrating how the annotation may be updated in different view angles is shown in FIG. 4.

Turning now to the figures, FIG. 1 illustrates diagrammatically an exemplary embodiment of an imaging system 10 for acquiring and processing image data. In the illustrated embodiment, imaging system 10 is a digital x-ray imaging system designed both to acquire original image data and to process the image data for display. The imaging system 10 may be a stationary or mobile x-ray system. In the embodiment illustrated in FIG. 1, the imaging system 10 is depicted as a C-arm fluoroscopic imaging system, yet it may be understood that other forms of imaging and/or navigation systems may be used within the scope of the present disclosure. For example, it may be understood that the present techniques may also be useful when applied to images acquired using other imaging modalities, such as standard, non-fluoroscopic x-ray imaging, tomosynthesis, and so forth. The present discussion of a fluoroscopic imaging modality is provided merely as an example of one suitable imaging modality. For example, the imaging system 10 may be any projection imaging system that acquires two-dimensional projections of three-dimensional objects.

The imaging system 10 may acquire x-ray attenuation data at a variety of views around a patient and suitable for tomographic reconstruction. The imaging system 10 includes an x-ray source 56 secured to a C-arm 14. The x-ray source 56 may exemplarily be an x-ray tube, a distributed x-ray source (such as a solid-state or thermionic x-ray source) or any other source of x-ray radiation suitable for the acquisition of medical or other images. The x-ray source 56 may also be referred to as a radiation source. For example, the x-ray source 56 may comprise an x-ray generator and x-ray tube. The x-ray source 56 emits x-ray radiation 16 from a focal spot 12 in the direction of a subject (or object) 18. For example, the subject 18 may be a patient. In the depicted embodiment, the x-ray radiation 16 is emitted in a cone shape, e.g., a cone-beam. This cone-beam of x-rays pass through an imaged volume of the subject 18. An incident portion (also referred to as incident x-rays) 20 of the x-ray radiation 16 passes through or around the subject 18 and impacts (or impinges on) an x-ray detector 34 including a detector array 22. The x-ray detector 34 is a digital x-ray detector and may be portable or permanently mounted to the imaging system 10. The x-ray detector 34 may also be referred to as a radiation detector. In certain embodiments, the detector array 22 may convert the incident x-ray photons to lower energy photons which are detected. Electrical signals are generated in response to the detected photons, and these signals are processed to reconstruct images of the features within the subject 18. Together, the x-ray source 56 and the x-ray detector 34 comprise an x-ray imaging chain.

As an example, the detector array 22 may include one or more complementary metal oxide semiconductor (CMOS) light imager panels, each separately defining an array of detector elements (e.g., pixels). Each detector element produces an electrical signal that represents the intensity of the x-ray beam incident at the position of the detector element when the beam strikes the detector array 22. This signal may be digitized and sent to a monitor/display device for display.

The x-ray source 56 and the x-ray detector 34 are exemplarily controlled by a system controller 24 that provides both power and control signals for the operation of the imaging system 10. The system controller 24 may control the x-ray source 56 via an x-ray controller 26, which may be a component of the system controller 24. In such an embodiment, the x-ray controller 26 may be configured to provide power and timing signals to the x-ray source 56.

The x-ray detector 34 is further exemplarily connected to the system controller 24. The system controller 24 controls the acquisition of the signals generated in the x-ray detector 34 (e.g., by the detector array 22). In an exemplary embodiment, the system controller 24 acquires the signals generated by the detector array 22 using a data acquisition system (DAS) 28. The DAS 28 receives data collected by readout electronics of the x-ray detector 34. The DAS 28 may receive sampled analogue signals from the x-ray detector 34 and convert the data to digital signals for subsequent processing by a processor 30 discussed in further detail herein. Alternatively, in other embodiments, the analogue to digital conversion may be performed by circuitry provided on the x-ray detector 34 itself. The system controller 24 may also execute various signal processing and filtration functions with regard to the acquired image signals, such as, but not limited to, initial adjustment of dynamic ranges and interleaving of digital image data.

Further, the x-ray detector 34 includes or communicates with control circuitry in the system controller 24 that commands acquisition of the signals generated in the detector array 22. The x-ray detector 34 may communicate with the system controller 24 via any suitable wireless communication or through a cable or other mechanical connection. Alternatively, operational commands may be implemented within the x-ray detector 34 itself.

The system controller 24 is further operationally connected to the C-arm 14 as well as to a table 32 configured to support the subject 18. A motor controller 36 of the system controller 24 provides instructions and commands to mechanical components of the C-arm 14 and the table 32 to carry out linear and/or rotational movement thereof. The linear and/or rotational movement of the C-arm 14 enables the x-ray source 56 and the x-ray detector 34 to be rotated one or multiple turns about the subject 18, such as rotated primarily in an X-Y plane or angled with respect to the subject. The distance between the x-ray detector 34 and the x-ray source 56 may also be adjusted. Further, the table 32 supporting the subject 18 may be ordinately moved with respect to the movement of the C-arm 14 and/or planned movement of the C-arm 14 to position the patient within the imaging field of view of the imaging system 10. Thus, movement of the patient and/or components of the imaging system to adjust the imaging field of view may include one or both of movements of the C-arm 14 and the table 32.

In general, system controller 24 commands operation of the imaging system 10 (such as via the operation of the x-ray source 56, the x-ray detector 34, and positioning systems described above) to execute examination protocols and to process acquired data. For example, the system controller 24, via the systems and controllers noted above, may rotate a gantry supporting the x-ray source 56 and the x-ray detector 34 about an area of interest or target T so that x-ray attenuation data may be obtained at a variety of views relative to the target T. For example, a central axis 52 of the x-ray radiation 16 may be focused at the target T. In the present example, the system controller 24 may also include signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processor 30 for reconstruction of images. The processor 30 may be one or more conventional microprocessors. The data collected by the DAS 28 may be transmitted to the processor 30 directly or after storage in a memory 38. Any type of memory suitable for storing data might be utilized by the imaging system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below. For example, the processor 30 may be operatively coupled to the memory 38. One example of image reconstruction may include cone beam computed tomography (CBCT) wherein images acquired at multiple angles about the subject 18 are projected against each other to form voxels of a 3D representation of the imaged region. Other forms of image reconstruction, including but not limited to processing image data from the detector signal to produce clinically useful images, may be used.

The processor 30 may be configured to receive commands and scanning parameters from an operator via an operator workstation 40, typically equipped with a keyboard, touchscreen and/or other input devices. The operator may control the imaging system 10 via the operator workstation 40. Thus, the operator may observe the reconstructed images and/or otherwise operate the imaging system 10 using the operator workstation 40. For example, a display 42 coupled to the operator workstation 40 may be utilized to observe the reconstructed images and to control imaging. Additionally, the images also may be printed by a printer 44 which may be coupled to the operator workstation 40.

Further, the processor 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. The PACS 46 may in turn be coupled to a remote client 48, radiology department information system (RIS), hospital information system (HIS) or to an internal or external network, so that others at different locations may gain access to the raw or processed image data.

While the preceding discussion has described the various exemplary components of the imaging system 10 separately, these various components may be provided within a common platform or in interconnected platforms. For example, the processor 30, the memory 38, and the operator workstation 40 may be provided collectively as a general or special purpose computer or workstation configured to operate in accordance with the aspects of the present disclosure. In such embodiments, the general or special purpose computer may be provided as a separate component with respect to the data acquisition components of the imaging system 10 or may be provided in a common platform with such components. Likewise, the system controller 24 may be provided as part of such a computer or workstation or as part of a separate system dedicated to image acquisition.

The imaging system 10 as shown in FIG. 1 may also include a variety of alternative embodiments generally configured to meet the particular needs of certain applications. For example, the imaging system 10 may be a fixed system, a mobile system, or a mobile C-arm system where the x-ray detector 34 is either permanently mounted inside one end of the C-arm 14 or removable from the system. Further, the imaging system 10 may be a table and/or wall stand system in a fixed x-ray room where the x-ray detector 34 is either permanently mounted together with the system or portable. Alternatively, the imaging system 10 may be a mobile x-ray system with a portable x-ray detector. Such a portable x-ray detector may be further constructed with a detachable tether or cable used to connect the detector readout electronics to the data acquisition system of the scanner. When not in use, the portable x-ray detector may be detached from the scan station for storage or transfer. In practice, the imaging system 10 may be any suitable x-ray based imaging system, including, but not limited to, conventional radiography systems, CT imaging systems, tomosynthesis systems, C-arm systems, fluoroscopy systems, mammography systems, dual- or multiple-energy systems, navigational or interventional imaging systems, and so forth. Further still, while an example of a flat-panel detector was described above, a digital detector system including image intensifier and a video camera may be used to convert the incident x-rays 20 to a video signal.

As used herein, the phrase "reconstructing an image" is not intended to exclude embodiments of the present invention in which data representing an image are generated but a viewable image is not. Therefore, as used herein, the term "image" broadly refers to both viewable images and data representing a viewable image. However, many embodiments generate (or are configured to generate) at least one viewable image.

As will be described in more detail below, the subject 18 may be imaged with the x-ray imaging chain, including the x-ray source 56 and the x-ray detector 34. Although not explicitly shown, it may be understood that the x-ray imaging chain may further include various lenses (e.g., a collimating lens and/or a focusing lens) and apertures. The x-ray imaging chain is positioned around the subject 18 at different angles that are chosen by an operator (e.g., a clinician). The subject 18 lays on the table 32, and the position of the table 32 may also change throughout the imaging. The acquired x-ray images are 2D conic projections, and the changes to the imaging chain and the position of the table 32 may enable the operator to see an anatomy of the subject 18 under different angles and magnification factors. For example, a workflow of the imaging procedure may include acquiring several image sequences, which may be used to diagnose and if necessary, intervene on the subject 18. An anatomical place of interest may be viewed in these different images. However, as the x-ray imaging chain orientation and/or the positioning of the table 32 changes, the location of the anatomical place of interest in the acquired image also changes.

In some examples, the operator or an assistant tags an anatomical structure to more easily retrieve it later. It can be useful, for example, when a contrast injection happens. Then injected vessels are easily visible in the image. Once the contrast has washed out, the identification of the location is lost unless tagged. However, because the view angle changes, as mentioned above, the location of the tagged anatomical structure also changes on the image.

As such, FIG. 2 provides an example method 200 for dynamically annotating images obtained during an interventional imaging procedure, such as using the imaging system 10 shown in FIG. 1. The method 200 will be described with regard to the system and components shown in FIG. 1, although it may be understood that the method may be implemented with other systems and components without departing from the scope of this disclosure. In particular, the method 200 will be described with respect to x-ray imaging (e.g., fluoroscopic imaging). The method 200 may be implemented as executable instructions in non-transitory memory of a computing device, such as the memory 38 of FIG. 1.

At 202, the method 200 includes adjusting an imaging chain to a first position to image a region of interest (ROI). For example, the ROI may be an anatomy of interest, such as an anatomical region (e.g., neck) or feature, such as vasculature (e.g., arteries and/or veins), bones, organs, etc. of a subject to be imaged (e.g., the subject 18 of FIG. 1). The first position may include an angle (e.g., angular position) with respect to a table supporting the subject (e.g., the table 32 of FIG. 1). In some examples, an operator of the imaging system may select the ROI and the first position, and the imaging chain may be adjusted accordingly (e.g., via the motor controller 36 of FIG. 1) in order to center the ROI between an x-ray source of the imaging chain and an x-ray detector of the imaging chain (e.g., the x-ray source 56 and the x-ray detector 34 of FIG. 1). Further, in some examples, a position of the table may be adjusted (e.g., translated) with respect to the imaging chain. The first position may be a first position with respect to time (e.g., an initial position), at least in some examples. Thus, the first position may define the angular and translational position of the imaging chain with respect to the table.

It may be understood that in addition to selecting the ROI, the operator may input or select exam information, such as via an operator workstation (e.g., the operator workstation 40 of FIG. 1). The exam information may include an exam type and/or an exam protocol. For example, the exam type or exam protocol may specific the anatomy being imaged, prescribe a series of views to acquire and the corresponding positions of the imaging chain and/or table to acquire the series of views, as well as indicate whether or not a contrast agent is used and its type. For example, the contrast agent may be administered to the subject in order to aid visualization of the anatomy of interest. As one example, the contrast agent may be injected in order to visualize the vasculature.

As still another example, the exam information may include x-ray tube voltage, current, and pulse-width settings for the x-ray source as well as frame rate settings and magnification for acquiring images at the x-ray detector. The detector may then generate a synchronization signal when an equilibrium condition is reached and send the synchronization signal back to the system controller. The x-ray source may wait for the synchronization signal from the detector and start generating x-rays at the synchronization signal once x-ray exposure is enabled. The workstation/image processing unit may stop current activities, initialize the acquisition and image processing modules, and wait for incoming frames. Further, in some examples, during the exposure preparation phase, a filament of the x-ray tube may be pre-heated (e.g., via applying a certain amount of voltage over the filament prior to x-ray exposure) in order to reduce the amount of time for the x-ray tube to reach the current setting. For example, the filament may be heated to a predetermined temperature that is based on the current setting such that the current setting may be rapidly reached once exposure begins.

At 204, the method 200 includes activating the x-ray source and acquiring a first image of the ROI. For example, x-ray exposure may be initiated in response to a command from the operator to being an imaging sequence, and the x-ray tube is operated at the voltage and current settings. This causes x-rays to be generated and sent to, through, and around the subject before impinging on the detector so that the first image is acquired. In some examples, the first image may be a first image of the imaging sequence with respect to time. The first image may be acquired relatively quickly (e.g., 10 milliseconds) after the exposure command is sent out. In some examples, the filament of the x-ray tube may be maintained at an elevated temperature (e.g., relative to room temperature) as explained above, which may allow the predefined current to be rapidly reached.

At 206, the method 200 includes displaying the first image. For example, the first image may be output to a display operationally coupled to the imaging system (e.g., the display 42 of FIG. 1) in substantially real-time (e.g., as the first image is acquired and without intentional delay). Further, the first image may be stored in memory.

At 208, the method 200 includes receiving an annotation on the displayed first image. For example, the first image may be displayed within an imaging application or interface that includes annotation tools. The annotation tools may enable the operator (or an assistant) to interact with the displayed image, such as by drawing one or more lines, points, arrows, boxes, etc. on the displayed image to annotate an anatomical feature or area of interest, which will be referred to herein as an annotated feature. The annotation may be colored, edited or deleted. In some examples, the operator may also include a ruler as the annotation or as part of the annotation.

It may be understood that in some examples, the operator may not annotate the first image obtained in the imaging sequence with respect to time. For example, more than one image may be acquired at the first position, or the imaging chain position may be adjusted before the operator finds a view showing the feature to be annotated. Therefore, it may be understood that as used herein, the term "first image" refers to the first image with respect to time to receive an annotation, and the term "first position" refers to the position of the imaging chain when the first annotated image is acquired. For example, at least a portion of the method 200 may be repeated (e.g., from 202 to 206) until the annotation is received. As such, the disclosure is not meant to be limited to receiving an annotation on a first image acquired in the imaging sequence with respect to time. Further, the first annotated image may also be referred to as a reference image.

In still other examples, additionally or alternatively, the annotation may be automatically performed without input (or with reduced input) from the operator. For example, an image analysis algorithm may be used to identify anatomical features, such as the vasculature as displayed with a contrast agent injection. The image analysis algorithm may include computer vision and/or segmentation algorithms, for example. Further, the operator may adjust or otherwise interact with the automatically determined annotation, at least in some examples.

At 210, the method 200 includes determining a three-dimensional (3D) location of the annotation based on a geometry of the imaging chain in the first position. For example, the processor may determine the location of the annotation in virtual 3D space by determining an intersection between a line L and a plane P. The line L may be defined as a line between the x-ray source and the annotation defined at a position on the x-ray detector. The plane P may be defined using one of a plurality of different strategies. For example, the plane P may be a plane parallel to the table and spaced apart from the table by a distance chosen by the operator at the beginning of the imaging procedure or as part of a pre-programmed exam protocol (e.g., as selected at 202). As another example, the plane P may be parallel to the detector at the time of placing the annotation and spaced apart from the detector by a predetermined distance (which may be the same or different than the distance described above). Thus, the plane P may be parallel to and spaced apart a pre-determined distance from a reference object (e.g., the table or the x-ray detector) and exists between the x-ray source and the x-ray detector. Further the plane P intersects the subject. The selection between these approaches or any other similar approaches may depend on the type of clinical procedure being performed. The 3D location of the annotation may also be stored in memory. An example illustrating the line L and the plane P will be described below with respect to FIG. 3.

Two virtual points may also be determined. As will be elaborated below, the virtual points may be used during an accuracy check to control whether or not the annotation is displayed on subsequent images. To determine the virtual points, the processor may define two additional planes P1 and P2 that are parallel to the plane P. The planes P1 and P2 may be positioned with one on each side of the plane P and may serve as boundaries for the true 3D anatomical location of the annotated feature. The plane P1 may be spaced apart from the plane P in a first direction, and the plane P2 may be spaced apart from the plane P in a second direction that is opposite to the first direction. For example, the plane P1 may be positioned closer to the x-ray source compared with the plane P, and the plane P2 may be positioned closer to the detector compared with the plane P. In some examples, the positions of the planes P1 and P2 may be chosen based on a thickness of the subject such that the planes P1 and P2 both intersect the subject. A first virtual point V1 may be determined at an intersection between L and P1, and a second virtual point V2 may be determined at an intersection between L and P2.

Further, when the ruler is included in the annotation, the processor may directly derive a magnification factor. This may enable the processor to determine a length of the annotation (e.g., when the annotation is a line) at the anatomy level under the hypothesis that the anatomical feature of interest is in a plane. For example, the ruler comprises a linear segment having a length that is initially drawn in a 2D image plane of the first image. The length may be determined by computing the Euclidean distance separating a first end of the linear segment and a second end of the linear segment in the plane P. As another example, the length may be determined by computing the length of the drawn segment in the first image multiplied by a scaling factor associated to a middle point at the middle of the segment, with the scaling factor determined from the 3D location of this middle point.

At 212, the method 200 includes adjusting the imaging chain to a subsequent position to image the ROI. For example, the subsequent position may be a next position with respect to time. That is, the subsequent position occurs later in time (e.g., after) the first position. For example, the subsequent position may be a second position that occurs after the first position. The motor controller may adjust the imaging chain to the subsequent position in response to a command received from the operator or according to the selected imaging protocol. The subsequent, second position may have a different angle of the imaging change with respect to the table supporting the subject than the initial, first position. Additionally or alternatively, the subsequent position may have a different table translation compared with the first position. As still another example, additionally or alternatively, the subsequent position may have a different magnification than the first position. As such, the second position may provide a different view of the ROI than the first position. Further, the x-ray tube voltage, current, and pulse-width settings may be the same as or different than those used in the first position.

At 214, the method 200 includes activating the x-ray source and acquiring the subsequent image of the ROI. For example, the x-ray exposure may be initiated in response to a command from the operator, such as described above at 204. The x-rays generated in response to the exposure initiation may be sent to, through, and around the subject before impinging on the detector to acquire the subsequent image. For example, the subsequent image may be a second image, acquired after the first image with respect to time. Thus, the second image is the "subsequent" image in the imaging sequence after the first image.

At 216, the method 200 includes determining a location of the annotation on the subsequent image and a distance between the virtual points based on the determined 3D location and the imaging chain geometry in the subsequent position. For example, the processor may project the annotation, which is defined in 3D space, in the imaging plane, which may be referred to as a plane IP, of the subsequent (e.g., second) image. For example, the processor may geometrically determine the position of the annotation knowing the rotational change in angle of the imaging chain, the translational change of the table, and/or the change in the magnification between the first position and the second position as well as the 3D position of the annotation via a geometric transformation. These configuration elements of the imaging chain (e.g., the rotational change in angle, the translational change of the table, and/or the change in the magnification) are combined together in a projection matrix that summarizes the relation between the 3D space and the image plane of the subsequent image.

At 218, the method 200 includes determining if a distance between the virtual points satisfies an accuracy check. The position of the two virtual points in the current imaging plane IP is determined as a standard projection based on the geometry of the imaging chain in the subsequent position (e.g., the rotational position of the imaging chain, the position of the table, and/or magnification used in the subsequent position that are combined together in the projection matrix). As one example, the distance between the two virtual points may satisfy the accuracy check when the distance is less than a threshold distance. The threshold distance refers to a non-zero distance that is stored in the memory. As a non-limiting example, the threshold distance may be in a range between 5-10 millimeters (mm). Further, the operator may adjust the threshold distance in order to strengthen or relax the accuracy check. For example, the operator may adjust the threshold distance to be greater than 10 mm when a more general approximation of the position of the annotation on the subsequent image is useful.

If the distance between the virtual points satisfies the accuracy check (e.g., the distance is less than the threshold distance), the method 200 proceeds to 220 and includes displaying the subsequent image with the annotation in the determined location. That is, the processor places the annotation in the determined (2D) location on the displayed image such that the displayed position of the annotation on the 2D image changes in accordance with the change in the imaging chain geometry in order to accurately reflect the 3D location of the annotation. That is, the 3D location of the annotation stays the same, while the position of the annotation on the image changes due to the change in the imaging chain between the first location and the subsequent location. An example imaging sequence that demonstrates displaying the annotation on subsequent images with an updated location is illustrated in FIG. 4 and will be described below.

If the distance between the virtual points does not satisfy the accuracy check (e.g., the distance is greater than or equal to the threshold distance), the method 200 proceeds to 222 and includes displaying the subsequent image without the annotation. The 3D location of the annotation continues to be known, but the 2D location of the annotation is not shown on the subsequent image due to the inaccuracy of the location. For example, displaying the annotation in an inaccurate location may confuse the operator or provide otherwise distracting or unhelpful information. Further, the subsequent image may be stored in memory whether or not the annotation is superimposed on the subsequent for display.

At 224, the method 200 includes determining if the acquisition is completed. For example, the acquisition may be completed when all of the prescribed view angles are obtained for the current exam protocol. As another example, the operator may indicate that the acquisition is completed via an input.

If the acquisition is not completed, the method 200 returns to 212 and includes adjusting the imaging chain to the subsequent (e.g., next) position to image the ROI. As one example, the subsequent position may be a third position that occurs later in time than the second position. In this way, the sequence of images will continue to be acquired and the annotation location for the current image. As an illustrative example, an artery may be visible in the first image due to the use of a contrast agent. Therefore, the operator may annotate the artery in the first image. However, the contrast agent washes out over time and is no longer visible in some or all of the subsequently acquired images. Because the position of the annotation is dynamically updated, the operator may track the location of the artery in the subsequently acquired images even after the contrast agent washes out.

If the acquisition is completed, the method 200 proceeds to 226 and includes deactivating the x-ray source. For example, deactivating the x-ray source may include discontinuing power supply to the x-ray generator or placing the x-ray source into a lower power "stand-by" mode wherein the x-ray source is not actively generating x-rays until the imaging system is powered off. Further, in some examples, the x-ray detector may be unpowered or placed in a "stand-by" mode wherein power consumption is reduced and the x-ray detector is not actively generating electrical signals until the imaging system is powered off. The method 200 may then end. For example, the x-ray source may not be activated until the operator selects a new imaging protocol or provides another input to begin a new imaging sequence.

In this way, an annotation received on one medical image acquired by the imaging chain may be shown on subsequently acquired medical images, with its location dynamically updated as a geometry of the imaging chain changes. As a result, the operator may focus on the exam being performed instead of trying to mentally link the images together to follow the anatomical feature of interest.

Referring to FIG. 3, a schematic example of geometrically determining 3D location of an annotated place of interest is shown with respect to an imaging chain that may be included in an imaging system (e.g., the imaging system 10 of FIG. 1). The imaging chain includes an x-ray focal spot 312 that emits x-ray radiation 316 toward a patient 318 positioned on a table 332. An incident portion 320 of the x-ray radiation 316 impacts a detector array 322. FIG. 3 shows the imaging chain in a first position 300 and a second position 301.

An annotation is received on a first image acquired while the imaging chain is in the first position 300. The annotation is placed at a location 303 on the detector array 322. The location 303 is defined with respect to a known coordinate system of the detector array 322 and corresponds to a position of the annotation on the first image. For example, the position of the annotation on the first image may be mapped to a location on the detector array 322 that obtained the corresponding portion of the image. A processor (e.g., the processor 30 of FIG. 1) defines a plane 302 (e.g., the plane P described with respect to the method of FIG. 2) that is parallel to the detector array 322 at a defined distance d1 from the detector array 322. The processor also defines a line 304 (e.g., the line L described with respect to the method of FIG. 2) that extends between the x-ray focal spot 312 and the location 303. The received annotation may then be associated to a 3D point 310 which is at the intersection of the plane 302 and the line 304 joining the x-ray focal spot 312 and the location 303. Note that in other examples, the plane 302 is instead defined as a plane 350 that is parallel to the table 332 at a defined distance d2 above the table 332.

A first parallel plane 306 and a second parallel plane 308 are defined with respect to the plane 302 (e.g., the plane P1 and the plane P2 described with respect to FIG. 2). The first parallel plane 306 and the second parallel plane 308 are each parallel to and spaced apart from the plane 302. The first parallel plane 306 is closer to the x-ray focal spot 312 than the plane 302, and the second parallel plane 308 is closer to the detector array 322 (and farther from the x-ray focal spot 312) than the plane 302. A first virtual point 314 is defined at the intersection of the line 304 and the first parallel plane 306, and a second virtual point 324 is defined at the intersection of the line 304 and the second parallel plane 308. The 3D point 310 associated with the annotation, the first virtual point 314, and the second virtual point 324 are all defined within a virtual 3D location that does not use precise 3D modeling or rendering, reducing the computational resources used in determining the 3D locations of the points. Further, the locations are stored in memory.

The imaging chain is adjusted to a second position 301 to acquire a second image. As such, the positions of the x-ray focal spot 312 and the detector array 322 are different with respect to the patient 318 and the table 332. The positions of the x-ray focal spot 312 and the detector array 322 have changed relative to the 3D point 310 associated with the annotation, the first virtual point 314 and the second virtual point 324. However, the 3D point 310, the first virtual point 314, and the second virtual point 324 have not changed relative to the table 332 and the patient 318. Because the virtual 3D positions of the 3D point 310, the first virtual point 314, and the second virtual point 324 are known and the geometry of the imaging chain in the second position 301 is known, the positions of the 3D point 310, the first virtual point 314, and the second virtual point 324 are projected onto the detector array 322, the position of which defines an image plane. The image plane is a 2D plane. Through the projection, the position of the 3D point 310 associated with the annotation is updated to a position 305 on the detector array 322. As such, the location of the annotation on the second image is updated by mapping the position 305 to the second image based on the known coordinate system of the detector array 322. Further, the annotation is displayed on the second image in response to an accuracy check being satisfied that evaluates a distance between a position 307 of the projection of the first virtual point 314 into the image plane (e.g., the plane of the detector) and a position 309 of the projection of the second virtual point 324 into the image plane.

Turning now to FIG. 4, an example sequence 400 of x-ray images of a phantom that include a dynamically updated annotation is shown. The sequence 400 includes a first image 402 obtained in a first imaging chain position. The first image 402 serves as a reference image and receives an initial annotation 412. The initial annotation 412 is positioned at a beginning of a structure schematically representing an artery that has been injected with contrast agent in the phantom. Although the structure does not lose contrast over time in the phantom, if a human subject were imaged instead, it may be understood that the contrast agent would wash out over time, and the artery would no longer be darkly colored in the x-ray image.

The sequence 400 includes a second image 404 obtained in a second imaging chain position that is different than the first position. The second position includes a 28 mm translation of the phantom with respect to the first position of the first image 402, such as by moving a table supporting the phantom with respect to the imaging chain. A processor (e.g., the processor 30 of FIG. 1) determines an updated location of the annotation, such as according to the method of FIG. 2 and using the geometric analysis schematically shown in FIG. 3. Once the updated location is determined, the annotation is shown as a first updated annotation 414 on the second image 404 (e.g., in response to an accuracy check being satisfied). The initial annotation 412 is shown by a dashed lines having a thinner line width to enable comparison of the positon of the initial annotation 412 and the first updated annotation 414, although it may be understood that only the first updated annotation 414 may be shown on the second image 404. The first updated annotation 414 overlaps with the initial annotation 412, showing good agreement between the calculated position and the exact position of the annotation as received on the first image 402.

A third image 406 is obtained while the imaging chain is in a third imaging chain position that is different than each of the first position and the second position. The third imaging chain position is not translated with respect to the first imaging chain position used while acquiring the first image 402 but is rotated by 5 degrees. The processor again determines an updated location for the annotation, shown as a second updated annotation 416 in comparison the initial annotation 412.

A fourth image 408 of the imaging sequence 400 is obtained while the imaging chain is in a fourth imaging chain position, which is rotated 10 degrees relative to the first imaging chain position. The processor determines an updated location for the annotation on the fourth image 408 based on the 10 degree rotation and displays the annotation as a third updated annotation 418, which is close in position to the initial annotation 412.

A fifth image 410 of the imaging sequence 400 is obtained while the imaging chain is in a fifth imaging chain position, which is rotated 15 degrees relative to the first imaging chain position. The processor determines an updated location for the annotation on the fifth image 410 based on the 15 degree rotation and displays the annotation as a fourth updated annotation 420. Because the rotation of the imaging chain is the largest of the sequence 400 in the fifth image 410, an accuracy of the placement is decreased. For example, the fourth updated annotation 420 is farther from the initial annotation 412 in the fifth image 410 than the third updated annotation 418 is from the initial annotation 412 in the fourth image 408. If the processor determines that position of the fourth updated annotation 420 is too inaccurate, such as using a distance between virtual points defined during the initial annotation, the fourth updated annotation 420 will not be displayed on the fifth image 410.

In this way, images acquired during interventional procedures may be dynamically and accurately annotated to track anatomical structures across views. The dynamic annotation may assist a user to accurately reposition previously identified objects of interest instead of trying to mentally track them across views. As a result, a mental burden of the user is decreased, allowing the user to focus on patient care. Further, because the dynamically updated annotation enables anatomical structures to be accurately tracked across views, the location of anatomical structures that may not be visible in certain views (e.g., due to contrast washout) may be known. Further still, because the approach described herein does not build a complex 3D model, computational resources are reduced and a speed of the dynamic tracking is increased.

The technical effect of geometrically determining a three-dimensional position of an annotation received on a two-dimensional medical image during an imaging procedure is that the annotation may be repositioned on subsequently obtained medical images of the imaging procedure with reduced computational complexity.

This disclosure provides support for a method for a projection imaging system, comprising: acquiring a first image of a region of interest (ROI) with the projection imaging system in a first position, determining a three-dimensional (3D) location of an annotation on the first image via a geometric transformation using planes, acquiring a second image of the ROI with the projection imaging system in a second position, determining a location of the annotation on the second image based on the 3D location of the annotation in the first position and a geometry of the second position, and displaying the annotation on the second image in response to an accuracy check being satisfied. In a first example of the method, the projection imaging system comprises an x-ray source and an x-ray detector, and wherein determining the 3D location of the annotation on the first image via the geometric transformation using the planes comprises: defining a first plane that is parallel to a reference object and spaced apart from the reference object by a pre-determined distance, the first plane positioned between the x-ray source and the x-ray detector, defining a line that extends between the x-ray source and a position of the annotation on the x-ray detector in the first position, and setting the 3D location of the annotation at an intersection of the first plane and the line. In a second example of the method, optionally including the first example, the reference object is a table supporting a subject being imaged. In a third example of the method, optionally including one or both of the first and second examples, the reference object is the x-ray detector. In a fourth example of the method, optionally including one or more or each of the first through third examples, the position of the annotation on the x-ray detector in the first position is determined by mapping the first image to a coordinate system of the x-ray detector. In a fifth example of the method, optionally including one or more or each of the first through fourth examples, determining the location of the annotation on the second image based on the 3D location of the annotation in the first position and the geometry of the second position comprises projecting the 3D location of the annotation into an image plane that is parallel to the x-ray detector in the second position. In a sixth example of the method, optionally including one or more or each of the first through fifth examples, the method further comprises: defining a second plane that is parallel to the first plane and closer to the x-ray detector than the first plane, defining a third plane that is parallel to the first plane and closer to the x-ray source than the first plane, setting a first virtual point where the line and the second plane intersect, and setting a second virtual point where the line and the third plane intersect. In a seventh example of the method, optionally including one or more or each of the first through sixth examples, the accuracy check comprises: projecting the first virtual point and the second virtual point into an image plane that is parallel to the x-ray detector in the second position, and determining a distance between the projected first virtual point and the projected second virtual point in the image plane in the second position. In an eighth example of the method, optionally including one or more or each of the first through seventh examples, the accuracy check is satisfied in response to the distance being less than a threshold distance and is not satisfied in response to the distance not being less than the threshold distance, and the method further comprises displaying the second image without the annotation in response to the accuracy check not being satisfied.

The disclosure also provides support for a method for an x-ray imaging system, comprising: acquiring a series of images of a region of interest (ROI) of a subject with the x-ray imaging system, an imaging chain of the x-ray imaging system adjusted with respect to a table supporting the subject while acquiring the series, and updating a position of an annotation on each of the series of images based on a geometry of the imaging chain and the table while acquiring a given image of the series of images relative to a reference image of the series of images. In a first example of the method, the imaging chain includes an x-ray source and an x-ray detector, and wherein updating the position of the annotation on each of the series of images based on the geometry of the imaging chain and the table while acquiring the given image of the series of images relative to the reference image of the series of images comprises: receiving the annotation on the reference image while the reference image is displayed via a display, defining a first plane positioned in a space between the x-ray source and the x-ray detector and a line extending between the x-ray source and a location on the x-ray detector corresponding to a two-dimensional (2D) location of the annotation on the reference image, determining a three-dimensional (3D) location of the annotation at an intersection between the first plane and the line, and determining the updated position of the annotation on the given image of the series of images by projecting the 3D location of the annotation into a 2D image plane of the given image. In a second example of the method, optionally including the first example, the 2D image plane of the given image is defined by an angular and translational position of the imaging chain with respect to the table when the given image is acquired. In a third example of the method, optionally including one or both of the first and second examples, the first plane is parallel to the x-ray detector when the reference image is acquired and spaced apart from the x-ray source by a pre-determined distance. In a fourth example of the method, optionally including one or more or each of the first through third examples, the first plane is parallel to the table and spaced apart from the table by a pre-determined distance. In a fifth example of the method, optionally including one or more or each of the first through fourth examples, the method further comprises: displaying the annotation in the updated position on the given image of the series of images via the display in response to a distance between projections of virtual points being less than a threshold distance on the given image, and not displaying the annotation in the updated position on the given image of the series of images via the display in response to the distance between the projections of the virtual points not being less than the threshold distance on the given image. In a sixth example of the method, optionally including one or more or each of the first through fifth examples, a first virtual point of the virtual points is positioned at a first intersection of the line and a second plane that is parallel to the first plane and closer to the x-ray source than the first plane, and a second virtual point of the virtual points is positioned at a second intersection of the line and a third plane that is parallel to the first plane and closer to the x-ray detector than the first plane.

The disclosure also provides support for an imaging system, comprising: a radiation source configured to project a beam of radiation toward a subject positioned on a table, a radiation detector configured to receive the beam of radiation projected by the radiation source and impinged by the subject, and a processor operatively coupled to a memory storing instructions that, when executed, cause the processor to: acquire, via the radiation detector, a first image of a region of interest (ROI) of the subject while the radiation source and the radiation detector are in a first position with respect to the table, receive an annotation on the first image, determine a three-dimensional (3D) location of the annotation in the subject via a geometric transformation using parallel planes, acquire, via the radiation detector, a second image of the ROI while the radiation source and the radiation detector are in a second position with respect to the table, determine a two-dimensional (2D) position of the annotation on the second image by projecting the determined 3D location of the annotation into an image plane of the second image. In a first example of the system, to determine the 3D location of the annotation in the subject via the geometric transformation using the parallel planes, the memory includes further instructions that, when executed by the processor, causes the processor to: define a first plane that intersects the subject and is parallel to and one of the radiation detector and the table, define a line that extends between the radiation source and a position of the received annotation on the radiation detector in the first position, and set the 3D location of the annotation at an intersection of the first plane and the line. In a second example of the system, optionally including the first example, the memory includes further instructions that, when executed by the processor, causes the processor to: define a second plane that is parallel to the first plane and spaced apart from the first plane in a first direction, define a third plane that is parallel to the first plane and spaced apart from the first plane in a second direction, opposite the first direction, define a first virtual point where the second plane and the line intersect, and define a second virtual point where the third plane and the line intersect. In a third example of the system, optionally including one or both of the first and second examples, the system further comprises: a display, and wherein the memory includes further instructions that, when executed by the processor, causes the processor to: project the first virtual point and the second virtual point into the image plane of the second image, determine a distance between the projected first virtual point and the projected second virtual point on the second image, display the annotation on the second image via the display at the determined 2D location in response to the distance being less than a threshold distance, and display the second image via the display without the annotation in response to the distance being greater than or equal to the threshold distance.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for a projection imaging system, comprising:
    acquiring a first image of a region of interest (ROI) with the projection imaging system in a first position;
    receiving an annotation on the first image during an imaging procedure;
    determining a three-dimensional (3D) location of the annotation on the first image via a geometric transformation using planes, wherein determining the 3D location of the annotation on the first image via the geometric transformation using the planes comprises:
        defining a first plane that is parallel to a reference object and spaced apart from the reference object by a pre-determined distance, the first plane positioned between the x-ray source and the x-ray detector;
        defining a line that extends between the x-ray source and a position of the annotation on the x-ray detector in the first position; and
        setting the 3D location of the annotation at an intersection of the first plane and the line;
    acquiring a second image of the ROI with the projection imaging system in a second position;
    determining a location of the annotation on the second image based on the 3D location of the annotation in the first position and a geometry of the second position; and
    displaying the annotation on the second image in response to an accuracy check being satisfied;
    wherein the projection imaging system comprises an x-ray source and an x-ray detector.

2. The method of claim 1, wherein the reference object is a table supporting a subject being imaged.

3. The method of claim 1, wherein the reference object is the x-ray detector.

4. The method of claim 1, wherein the position of the annotation on the x-ray detector in the first position is determined by mapping the first image to a coordinate system of the x-ray detector.

5. The method of claim 1, wherein determining the location of the annotation on the second image based on the 3D location of the annotation in the first position and the geometry of the second position comprises projecting the 3D location of the annotation into an image plane that is parallel to the x-ray detector in the second position.

6. The method of claim 1, further comprising:
    defining a second plane that is parallel to the first plane and closer to the x-ray detector than the first plane;
    defining a third plane that is parallel to the first plane and closer to the x-ray source than the first plane;
    setting a first virtual point where the line and the second plane intersect; and
    setting a second virtual point where the line and the third plane intersect.

7. The method of claim 6, wherein the accuracy check comprises:

projecting the first virtual point and the second virtual point into an image plane that is parallel to the x-ray detector in the second position; and
determining a distance between the projected first virtual point and the projected second virtual point in the image plane in the second position.

8. The method of claim 7, wherein the accuracy check is satisfied in response to the distance being less than a threshold distance and is not satisfied in response to the distance not being less than the threshold distance, and the method further comprises displaying the second image without the annotation in response to the accuracy check not being satisfied.

9. A method for an x-ray imaging system, comprising:
acquiring a series of images of a region of interest (ROI) of a subject with the x-ray imaging system, an imaging chain of the x-ray imaging system adjusted with respect to a table supporting the subject while acquiring the series;
receiving an annotation on a reference image of the series of images; and
updating a position of the annotation on each of the series of images based on a geometry of the imaging chain and the table while acquiring a given image of the series of images relative to the reference image of the series of images, wherein updating the position of the annotation on each of the series of images based on the geometry of the imaging chain and the table while acquiring the given image of the series of images relative to the reference image of the series of images comprises:
receiving the annotation on the reference image while the reference image is displayed via a display;
defining a first plane positioned in a space between the x-ray source and the x-ray detector and a line extending between the x-ray source and a location on the x-ray detector corresponding to a two-dimensional (2D) location of the annotation on the reference image;
determining a three-dimensional (3D) location of the annotation at an intersection between the first plane and the line; and
determining the updated position of the annotation on the given image of the series of images by projecting the 3D location of the annotation into a 2D image plane of the given image;
wherein the imaging chain includes an x-ray source and an x-ray detector.

10. The method of claim 9, wherein the 2D image plane of the given image is defined by an angular and translational position of the imaging chain with respect to the table when the given image is acquired.

11. The method of claim 9, wherein the first plane is parallel to the x-ray detector when the reference image is acquired and spaced apart from the x-ray source by a pre-determined distance.

12. The method of claim 9, wherein the first plane is parallel to the table and spaced apart from the table by a pre-determined distance.

13. The method of claim 9, further comprising:
displaying the annotation in the updated position on the given image of the series of images via the display in response to a distance between projections of virtual points being less than a threshold distance on the given image; and
not displaying the annotation in the updated position on the given image of the series of images via the display in response to the distance between the projections of the virtual points not being less than the threshold distance on the given image.

14. The method of claim 13, wherein a first virtual point of the virtual points is positioned at a first intersection of the line and a second plane that is parallel to the first plane and closer to the x-ray source than the first plane, and a second virtual point of the virtual points is positioned at a second intersection of the line and a third plane that is parallel to the first plane and closer to the x-ray detector than the first plane.

15. An imaging system, comprising:
a radiation source configured to project a beam of radiation toward a subject positioned on a table;
a radiation detector configured to receive the beam of radiation projected by the radiation source and impinged by the subject; and
a processor operatively coupled to a memory storing instructions that, when executed, cause the processor to:
acquire, via the radiation detector, a first image of a region of interest (ROI) of the subject while the radiation source and the radiation detector are in a first position with respect to the table;
receive an annotation on the first image;
determine a three-dimensional (3D) location of the annotation in the subject via a geometric transformation using parallel planes;
acquire, via the radiation detector, a second image of the ROI while the radiation source and the radiation detector are in a second position with respect to the table, wherein the second image of the ROI is acquired after the annotation is received on the first image; and
determine a two-dimensional (2D) position of the annotation on the second image by projecting the determined 3D location of the annotation into an image plane of the second image;
wherein to determine the 3D location of the annotation in the subject via the geometric transformation using the parallel planes, the memory includes further instructions that, when executed by the processor, causes the processor to:
define a first plane that intersects the subject and is parallel to and one of the radiation detector and the table;
define a line that extends between the radiation source and a position of the received annotation on the radiation detector in the first position; and
set the 3D location of the annotation at an intersection of the first plane and the line.

16. The imaging system of claim 15, wherein the memory includes further instructions that, when executed by the processor, causes the processor to:
define a second plane that is parallel to the first plane and spaced apart from the first plane in a first direction;
define a third plane that is parallel to the first plane and spaced apart from the first plane in a second direction, opposite the first direction;
define a first virtual point where the second plane and the line intersect; and
define a second virtual point where the third plane and the line intersect.

17. The imaging system of claim 16, further comprising a display, and wherein the memory includes further instructions that, when executed by the processor, causes the processor to:

project the first virtual point and the second virtual point into the image plane of the second image;
determine a distance between the projected first virtual point and the projected second virtual point on the second image;
display the annotation on the second image via the display at the determined 2D location in response to the distance being less than a threshold distance; and
display the second image via the display without the annotation in response to the distance being greater than or equal to the threshold distance.

* * * * *